(12) United States Patent
Moore

(10) Patent No.: US 8,792,110 B2
(45) Date of Patent: Jul. 29, 2014

(54) SECURED DOCUMENT TRANSMISSION

(75) Inventor: Keith Moore, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 220 days.

(21) Appl. No.: 12/992,452

(22) PCT Filed: May 30, 2008

(86) PCT No.: PCT/US2008/065412
§ 371 (c)(1),
(2), (4) Date: Nov. 12, 2010

(87) PCT Pub. No.: WO2009/145791
PCT Pub. Date: Dec. 3, 2009

(65) Prior Publication Data
US 2011/0063648 A1  Mar. 17, 2011

(51) Int. Cl.
*G06K 15/00* (2006.01)

(52) U.S. Cl.
USPC ....... 358/1.14; 358/1.15; 358/1.18; 358/1.13; 713/154; 713/176; 713/182; 713/185

(58) Field of Classification Search
USPC ........... 358/1.14, 1.13, 3.28, 1.15, 1.16, 1.18; 715/165, 154, 166, 167, 176, 182–186
See application file for complete search history.

(56) References Cited

U.S. PATENT DOCUMENTS

| | | | |
|---|---|---|---|
| 4,786,941 A | 11/1988 | Regan | |
| 5,435,544 A * | 7/1995 | Mandel | 271/298 |
| 5,633,932 A * | 5/1997 | Davis et al. | 713/176 |
| 5,852,977 A | 12/1998 | Lynch | |
| 5,892,909 A | 4/1999 | Grasso et al. | |
| 6,029,247 A * | 2/2000 | Ferguson | 726/5 |
| 6,378,070 B1 | 4/2002 | Chan et al. | |
| 6,542,261 B1 * | 4/2003 | McGraw | 358/434 |
| 6,545,767 B1 | 4/2003 | Kuroyanagi | |
| 6,952,780 B2 | 10/2005 | Olsen et al. | |
| 6,996,235 B2 | 2/2006 | Foth | |
| 7,248,693 B1 * | 7/2007 | Tretter et al. | 380/55 |
| 7,308,572 B2 | 12/2007 | Goh et al. | |
| 7,313,699 B2 * | 12/2007 | Koga | 713/170 |
| 7,454,796 B2 * | 11/2008 | Mazzagatte et al. | 726/28 |

(Continued)

FOREIGN PATENT DOCUMENTS

| | | |
|---|---|---|
| CN | 1469295 | 1/2004 |
| CN | 1632738 | 6/2005 |

(Continued)

OTHER PUBLICATIONS

International Searching Authority, International Search Report and The Written Opinion, 11pages, Jul. 29, 2009.

(Continued)

*Primary Examiner* — Dennis Dicker

(57) ABSTRACT

Systems and methods for securing a document for transmission are discussed. In one embodiment, a document is checked for an indication of confidentiality. The document is then passed to a secure driver, in response to a finding of the indication of confidentiality. The document is passed to a non-secure driver, in response to a failure to find the indication of confidentiality. The document is then transmitted after processing by the secure driver or the non-secure driver.

10 Claims, 3 Drawing Sheets

(56) References Cited

U.S. PATENT DOCUMENTS

| | | | |
|---|---|---|---|
| 8,159,723 B2* | 4/2012 | Yamada | 358/3.28 |
| 8,253,956 B2* | 8/2012 | Han | 358/1.15 |
| 8,441,660 B2* | 5/2013 | Salgado | 358/1.14 |
| 8,559,033 B2* | 10/2013 | Kohli et al. | 358/1.15 |
| 2001/0012122 A1* | 8/2001 | Ueda | 358/1.15 |
| 2002/0171859 A1* | 11/2002 | Chen et al. | 358/1.14 |
| 2003/0035539 A1 | 2/2003 | Thaxton | |
| 2003/0044009 A1 | 3/2003 | Dathathraya | |
| 2003/0068045 A1 | 4/2003 | Foth | |
| 2003/0079134 A1 | 4/2003 | Manchala et al. | |
| 2003/0099353 A1 | 5/2003 | Goh et al. | |
| 2003/0107756 A1 | 6/2003 | Dan et al. | |
| 2003/0197887 A1* | 10/2003 | Shenoy et al. | 358/1.15 |
| 2004/0015779 A1 | 1/2004 | Shorter | |
| 2004/0057075 A1 | 3/2004 | Stewart et al. | |
| 2004/0136028 A1* | 7/2004 | Rabb | 358/1.15 |
| 2005/0168769 A1* | 8/2005 | Kim et al. | 358/1.14 |
| 2005/0197967 A1 | 9/2005 | Booth et al. | |
| 2006/0007482 A1* | 1/2006 | Nakahashi | 358/1.15 |
| 2006/0075460 A1* | 4/2006 | Anegawa et al. | 726/1 |
| 2006/0082808 A1 | 4/2006 | Borza | |
| 2006/0092433 A1* | 5/2006 | Stevens et al. | 358/1.1 |
| 2006/0114508 A1* | 6/2006 | Keeney et al. | 358/1.15 |
| 2006/0119892 A1* | 6/2006 | Kujirai | 358/1.15 |
| 2006/0256374 A1* | 11/2006 | Shima | 358/1.15 |
| 2007/0030961 A1 | 2/2007 | Mizutani et al. | |
| 2007/0171436 A1 | 7/2007 | Manchester | |
| 2008/0037065 A1 | 2/2008 | Kawata | |
| 2008/0055627 A1* | 3/2008 | Ellis | 358/1.14 |
| 2008/0225326 A1* | 9/2008 | Kephart et al. | 358/1.15 |
| 2008/0273224 A1* | 11/2008 | Maulsby et al. | 358/1.15 |
| 2009/0059276 A1* | 3/2009 | Matsuo | 358/1.15 |
| 2009/0290190 A1* | 11/2009 | Torii | 358/1.15 |
| 2010/0188698 A1* | 7/2010 | Koizumi | 358/1.15 |
| 2011/0173445 A1* | 7/2011 | Yami et al. | 713/166 |

FOREIGN PATENT DOCUMENTS

| | | |
|---|---|---|
| CN | 1638333 A | 7/2005 |
| KR | 10-2006-0107049 | 10/2006 |
| KR | 10-2007-0080114 | 8/2007 |

OTHER PUBLICATIONS

Supplemental European Search Reort mailed Jul. 3, 2013; issued in related European application No. 08874508.8.

\* cited by examiner

SECURED DOCUMENT TRANSMISSION

BACKGROUND

In many office and work environments, including those in corporate, hotel and other locations, it is common for two or more users to share a printer. Such printers may be installed in a networked environment and located in a public or semi-public location. Operation of a shared printer allows for the use of a far more upscale printer than would be possible if each user has an individually assigned printer. However, sharing a printer is not without some drawbacks.

In particular, it is common for a user to want to print a document that is of a 'confidential,' 'classified' and/or sensitive nature. Such documents can include business secrets, personal, medical, academic and/or financial data that the user and/or user's employer does not want released to the general populace or to a random non-affiliated individual. Loss of such a document can be expensive, embarrassing and may result in liability for damages.

Accordingly, some efforts have been made to develop systems and methods that prevent the release of confidential information. However, despite these efforts, confidential documents continue to be sent to printers where they may be picked up by the wrong person, and users continue to struggle to obtain their documents from printers using protective systems.

SUMMARY

A need exists for better systems and methods for secure document delivery or transmission. In one example of the subject matter disclosed herein, a document is checked for an indication of confidentiality. The document, once checked, is passed to a secure driver, in response to a finding of the indication of confidentiality. The document is passed to a non-secure driver, in response to a failure to find the indication of confidentiality. The document is then transmitted after processing by the secure driver or the non-secure driver.

This summary is provided to introduce a selection of concepts in a form that is less detailed than the discussion found in the Detailed Description. This Summary is not intended to identify key features or essential features of the claimed subject matter, nor is it intended for use as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
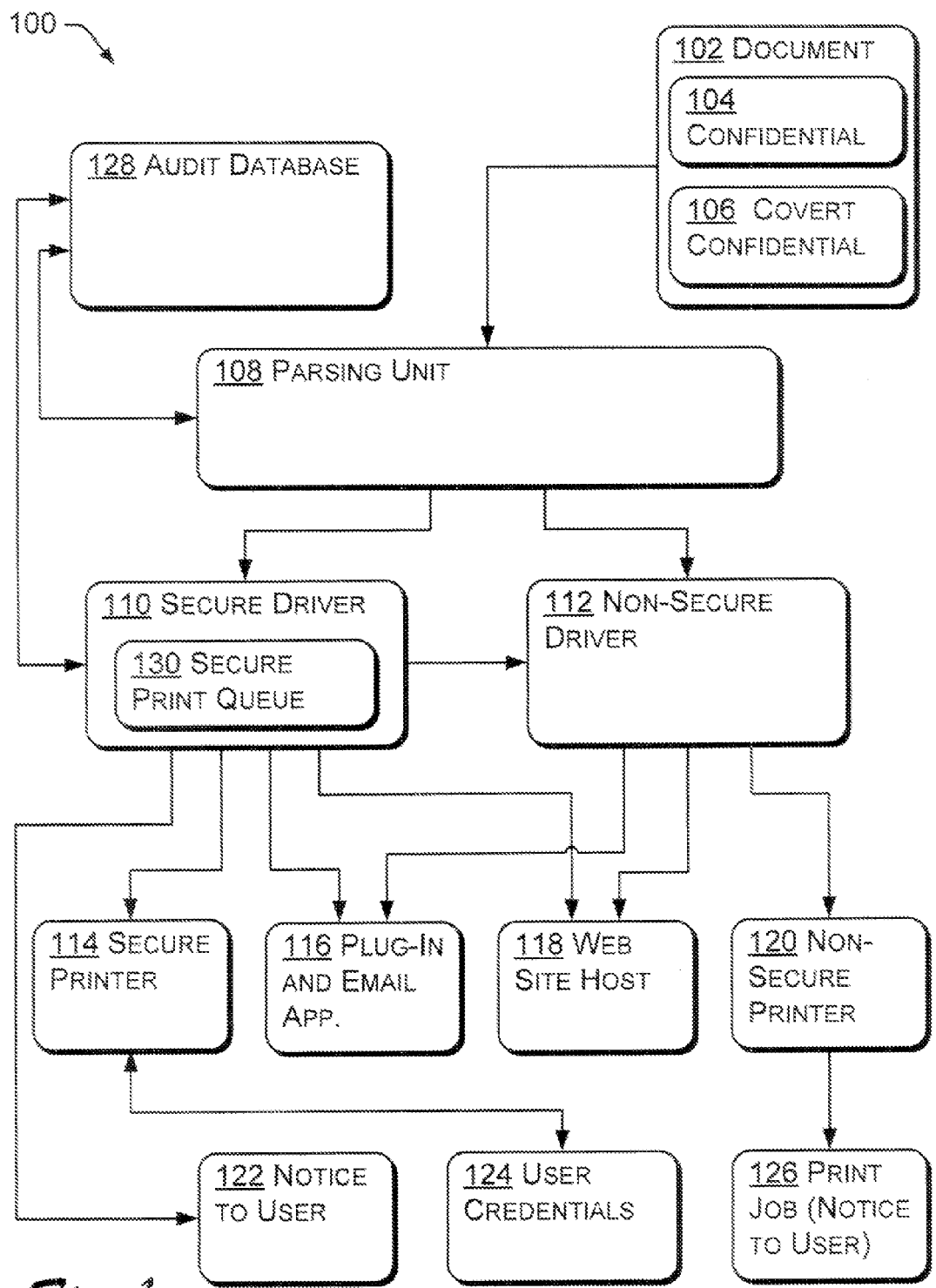
FIG. 1 shows an example embodiment illustrating aspects of secured document transmission discussed herein.

FIG. 1 shows an example system 100 for securing a document for transmission. The document can be secured, for example, by channeling it to a secure driver and to a secure printer. In the example of FIG. 1, a document is parsed for an indication of confidentiality, such as a confidentiality statement written into a header or footer of the document. In a different example, a hidden notation or other sign may indicate the document or file should be treated in a confidential manner. Where an indication of confidentiality is found, such as by a parsing unit checking the document, the document is passed to a secure driver. Where no indication of confidentiality is found, the document is passed to a non-secure driver. After processing by one of the drivers, the document is transmitted, such as to a printer or as an email message or as a webpage served by a website host.

A document 102 may be any type of document, such as a word processing document, a spreadsheet, a database or database report, a presentation-type (e.g. slideshow) document, email document, webpage document or other document as are generally known or newly developed. Documents such as JPEGS, wave sound files, audio visual documents and other document types may also be adapted for use with the systems and methods discussed herein.

The document 102 may be configured with one or more confidentiality indicators. The indicators may be located in any location within the document, such as within the 'body' of the document, a 'header,' 'footer' or other location. For example, in a spreadsheet, the indictor may be in one or more cells of the document. In a presentation document (e.g. as generated using PowerPoint® presentation program from Microsoft Corporation), the indicator may be located in any one page, or all pages, such as in a 'footer' or border or logo. Graphic, audio and/or audio visual files may be marked by confidentiality indicator(s) in any location (e.g. at the start and/or end of the file) as desired. Thus, the confidentiality indicator may be located as indicated or desired by any particular use, application and/or user or author preference or convention.

The confidentially indicator may be a visible indicator 104 of confidentiality or a hidden or covert indicator 106 of confidentiality. The visible indicator 104 is visible to the human eye (or ear), and typically comprises readable text. The visible indicator 104 may be a written notation, such as in the header, footer or other location within the document. The visible indicator 104 may be associated with, or comprise, a copyright notation. The written notation 104 may explicitly state that the document, is confidential, and that the document is proprietary to a company or organization, and should not be read by, given to, or otherwise appropriated by anyone outside a business, organization or corporation. Examples of such notations 104 are commonly seen in many corporate, organizational and government documents. While the wording of such notices may vary among documents and or organizations, any wording indicating confidentiality, secrecy or that the document is the property of an organization or corporation (or similar) is consistent with the confidentiality notation 104.

The document 102 may additionally or alternatively contain one or more covert (e.g. hidden) indicators 106. The hidden indicator 106 may be a 'watermark' or similar variation, such as alteration of graphics at the pixel level, wherein a hidden message is added to a logo, business graphics, font or other printed matter. Similarly, the covert confidentiality indicator 106 may be white text on a white background (or similar). Such a hidden indicator 106 indicates to a parsing device that the document is to be considered confidential, but does not convey similar meaning to the casual observer.

The parsing unit 108 is configured to check the document for an indication of confidentiality. The parsing unit 108 may look for either visible confidentiality indicators 104 or covert invisible confidentiality indicators 106 or both. In the example of FIG. 1, the parsing unit 108 looks at all text, graphics and images in the document 102 for indications of a visible confidentiality indicator 104 and/or a covert invisible confidentiality indicator 106. In the example of FIG. 1, the parsing unit 108 is configured to look for specific confidentiality indicator(s) 104, 106 that are known in advance. However, the parsing unit may alternatively be designed to examine the document 102 for confidentiality indicators that are not specifically known in advance, but which have features that suggest that they are, in fact, confidentiality indicators.

The parsing unit 108 returns a result, such as a flag or data element, indicating whether a confidentiality indicator 104, 106 was found. The result may be Boolean, such as "true" and "false." In some applications, it is not absolutely known or knowable if a confidentiality indicator is found. In such an application, a probability may be substituted. Where a probability has been substituted, a threshold may be used to indicate if the probability should be regarded as true or false. In some applications, the parsing unit 108 also returns whether a non-covert indicator 104, a covert indicator 106 or both was/were found.

If a confidentiality indicator 104, 106 is found, the document 102 is processed by a secure driver 110. On the contrary, if no confidentiality indicator 104, 106 is found, the document 102 is processed by a non-secure driver 112.

The secure driver 110 may be configured as secure printer driver, a secure email plug-in for an email application or as a driver associated with a webpage-serving host of a website. In one application wherein the secure driver 110 is configured for use as a secure printer driver, the driver is configured for use only with one or more secure printers 114. In a second application wherein the secure driver 110 is configured for use as a secure printer driver, the driver is configured to process the document 102 for transmission to a non-secure printer 120 (connection not shown for clarity) but only after providing the user with a warning 122. The warning or notice 122 may be displayed on a graphical user interface, and warns that the document is confidential and the user should make every effort to avoid loss at the non-secure printer 120.

In a typical example embodiment, the secure driver 110 will send the document 102—processed as a print job, such as by raster image processing—only to one or more secure printers 114. However, the user (e.g. the author of the document and/or initiator of the printing process) may anticipate that the print job will go to a non-secure printer 120. This is because the user may have the non-secure printer 120 set as a default printer, or habitually use the non-secure printer 120. To alleviate any confusion, the secure printer driver 110 may send the user a notice 122, such as a message delivered through a graphical user interface, indicating that the secure printer driver 110 has diverted the print job from an anticipated printer (e.g. non-secure printer 120) to a secure printer 114 or to a secure print queue 130 associated with the secure printer. Note that in FIG. 1, the secure print queue 130 is shown located within the secure print driver 110 as an example implementation. In a first alternative implementation, the secure print queue 130 could be located on its own server (e.g. a server dedicated for print queues and/or secure print queues) located between the secure driver 110 and the secure printer 114. In a second alternative implementation, the secure print queue 130 could be located within and/or near the secure printer 114. In some applications, such as those implementing 'pull printing' the print job remains within the secure print queue until adequate credentials have been presented by a user at the secure printer 114. Reasons for the diversion—e.g. the discovery of the indications of confidentiality—may also be provided to the user by the notice 122. Note that while the secure printer 114 and the non-secure printer 120 are illustrated as being separate printers, in some applications the same printer may have both secure and non-secure printing modes. For example, the printer may operate to print non-secure documents in a non-secure manner. However, if a secure document is to be printed, the printer shifts to a secure mode, wherein it adopts characteristics of a secure printer. For example, in a secure mode, the printer may perform 'pull printing.' Pull printing may involve aspects such as printing, or obtaining and printing, the document only after acceptable credentials have been presented to the printer by a user.

In some implementations, the secure printer driver 110 may encrypt the print job before sending it to the secure printer 114. In other applications, the secure printer driver 110 may not encrypt the print job, and will instead rely on the secure printer 114, or a secure print queue 130, to prevent document loss by requiring the user to present proper credentials 124 at the secure printer or at a room within which the secure printer 114 is located.

Unless the secure printer 114 is in a particularly secure location, such as a location wherein the user must present credentials 124 to enter, it is advantageous for the secure printer to be configured to require that the user provide a credential 124 to the printer 114. Presentation of credentials 124 can be made in any known or later developed manner. For example, swiping an employee badge, inputting a user ID or transaction code, providing bio-metric identification or any other type of agreed upon credential may be used. It is advantageous to require that the credential 124 be provided to the secure printer 114 before a print job associated with the document 102 is performed. Upon receipt of the credential 124, the printer 114 will process the job, or in a 'pull printing' application, request that the job be sent and then process the job upon receipt.

Note that if the user does not actually comprehend the meaning of the notice 122 (such as, because the user habitually clicks 'okay' without reading the message) the user may report to the non-secure printer 120 and wait for a print job that was diverted to the secure printer 114 (due to an indication of confidentiality discovered by the parsing unit 108). Accordingly, the user may not comprehend the situation. In this instance, one example implementation waits for a set, threshold or default period of time for the user to present credentials 124 to the secure printer 114. If the user does not do so, within the threshold period of time, the secure driver 110 will send the non-secure printer 120 a notice in the form of a print job 126 explaining to the user that the print job the user is waiting for was sent to the secure printer 114. Note that the secure driver 110 may send this print job to the non-secure printer 120 using the non-secure driver 112. Accordingly, notice is sent to the user at a default and/or expected printer indicating that the job is in the secure printer queue, and that credentials must be presented to initiate secure printing (e.g. a 'pull printing' operation).

In many instances, the parsing unit 108 will not find an indication of confidentiality 104, 106 in the document 102. In these instances, the parsing unit 108 will pass the document 102 to the non-secure driver 112. Such passage may take the form of an active selection process between sending the document 102 to the secure driver 110 or the non-secure driver 112. Alternatively, sending the document to the non-secure driver 112 may result from non-activation of a process intended to divert the print job to the secure printer driver 110. When the document is sent to a non-secure driver 112 configured as a printer driver, the document, configured as a print job (such as by raster image processing), will be sent to the non-secure printer 120. Thus in a typical implementation, a PostScript®, PDF (Portable Document Format®) or analogous file is sent to an IP address associated with the non-secure print queue or non-secure printer.

Note that the secure driver 110 and the non-secure driver 112 are illustrated for convenience as Separate entities. However, their functionality could easily be combined into a single driver having secure and non-secure characteristics. Accordingly, the block diagram of FIG. 1 is for purposes of example and discussion, and does not represent a required configuration or arrangement.

An audit database 128 is configured to record information about, and associating, documents, users, print times and related data. Thus, the audit database 128 may be updated to reflect passage of documents to the secure driver 110. Information in the audit database 128 may allow an information technology (IT) department or similar provider of computing services to provide answers to questions regarding who, what, when, where etc. that any secure document was printed, emailed, (web) served, etc.

As seen in the above discussion, the secure driver 110 and the non-secure driver 112 may be configured as a secure printer driver 110 and a non-secure printer driver 112, respectively. As such, the drivers 110, 112 perform the functionality of printer drivers, such as the generation of page description languages (e.g. PS, PCL, PDF, etc.), job tickets (PML, JDF) or raster images and related functionality. However, the secure driver 110 and the non-secure driver 112 can be configured as part of, or for use with, an email application (e.g. email client application such as Outlook® from Microsoft Corporation).

In particular, secure driver 110 and non-secure driver 112 can be configured as plug-ins for an email application 116. In such an application, the parsing unit 108 would examine emails for an indication of confidentiality—that is, the document 102 would be an email. In such an environment, the secure driver 110 could be configured to provide encryption functionality to secure any out-going email message found to be confidential. Note that this is particularly important if the email has multiple and/or forwarded parts, wherein one or more parts has a mark of confidentiality. Thus, when the parsing unit 108 parses email messages, multiple levels of attached documents may also be parsed and examined for indications of confidentiality. If any portion of the email message and/or attached document is considered to be confidential, then the entire email message is considered to be confidential. Additionally or alternatively, in the context operation with an email application, the secure driver 110 might review the email addresses of any recipients, to make sure that they are either allowed, or not non-allowed. Such a review might be made by inspection of each address, or by inspection of the domain name to which the email message is being sent. For example, an out-going confidential email may be required to have a certain domain(s) (e.g. within the company), or might be required to not have some other domain(s) (e.g. not within a competitor company). The non-secure driver 112 might have little or no functionality in such an email environment, in that the email application would function in a normal fashion if the parsing unit 108 did not find an indication of confidentiality.

Thus, the parsing unit 108 and the secure and non-secure drivers 110, 112 can be configured to operate in an environment wherein document 102 is any type of document, including an email message. Additionally, the email message(s) can have attachments, which are also parsed by the parsing unit 108 for indications of confidentiality. In a further example, the drivers 110, 112 can operate in a website host/server environment, wherein the document 102 is a webpage being served by a website host/server.

In a website environment, webpage authors may rapidly add and delete content (e.g. documents/webpages) to and from many locations in vast websites. Keeping track of which pages are confidential may be difficult. Accordingly, the parsing unit 108 may be configured to parse webpages for indications of confidentiality before serving them to website clients. If the webpage 102 includes either non-covert indications of confidentiality 104 or covert (hidden) indications of confidentiality 106, then the webpage would be passed to the secure driver 110. In the alternative situation, the webpage 102 would be passed to the non-secure driver 112 (if it is present).

In an example website environment, the secure driver 110 could be configured to provide a substitute webpage to the website host 118 if the webpage 102 is found by the parsing unit 108 to have covert and/or non-covert indications of confidentiality. The substitute page could indicate that the desired page is not currently available, and for the user to use the 'back' button on their browser.

Exemplary Methods

Figure 2A:
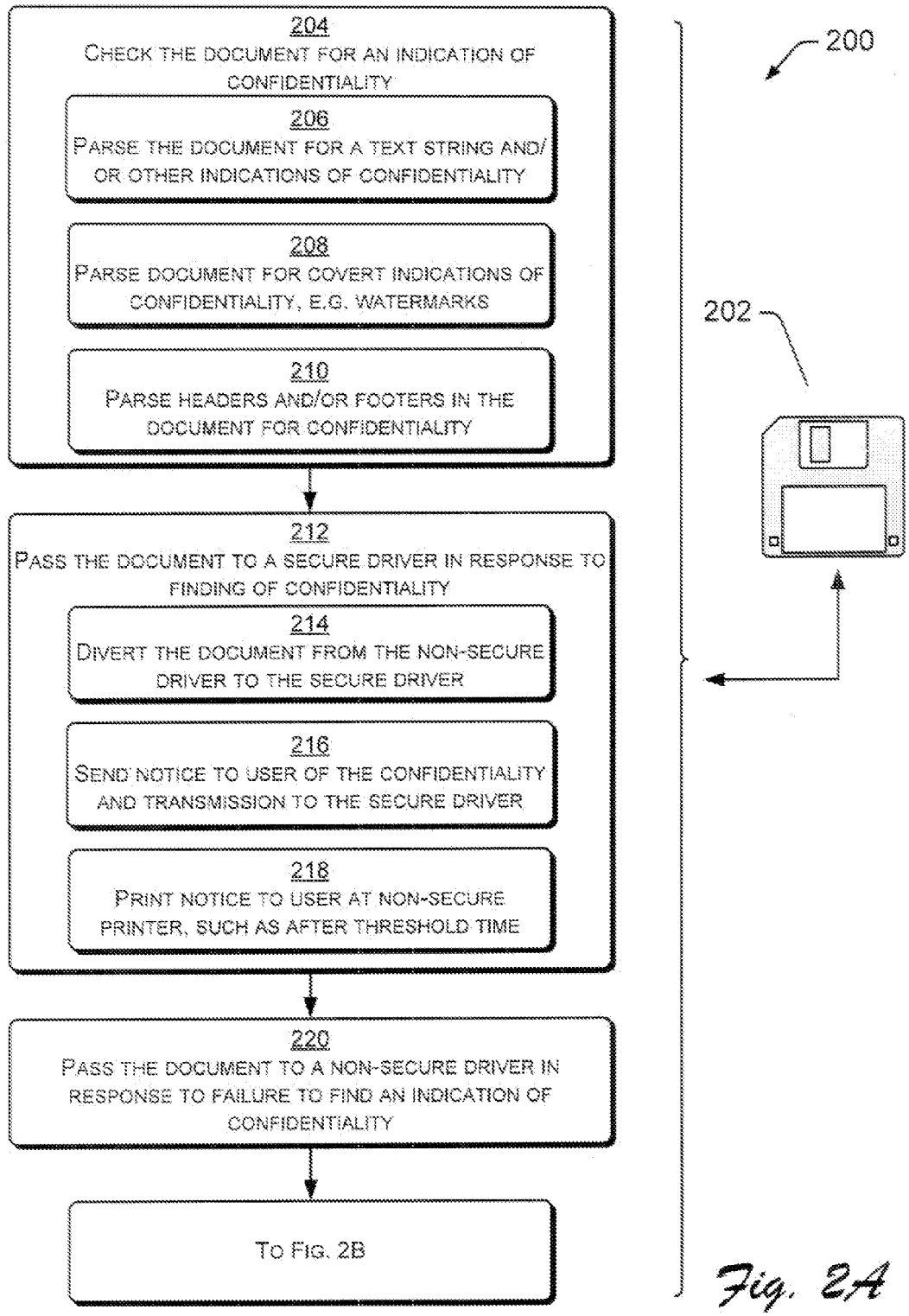
FIGS. 2A and 2B show an example method illustrating aspects of secured document transmission discussed herein.
Figure 2B:
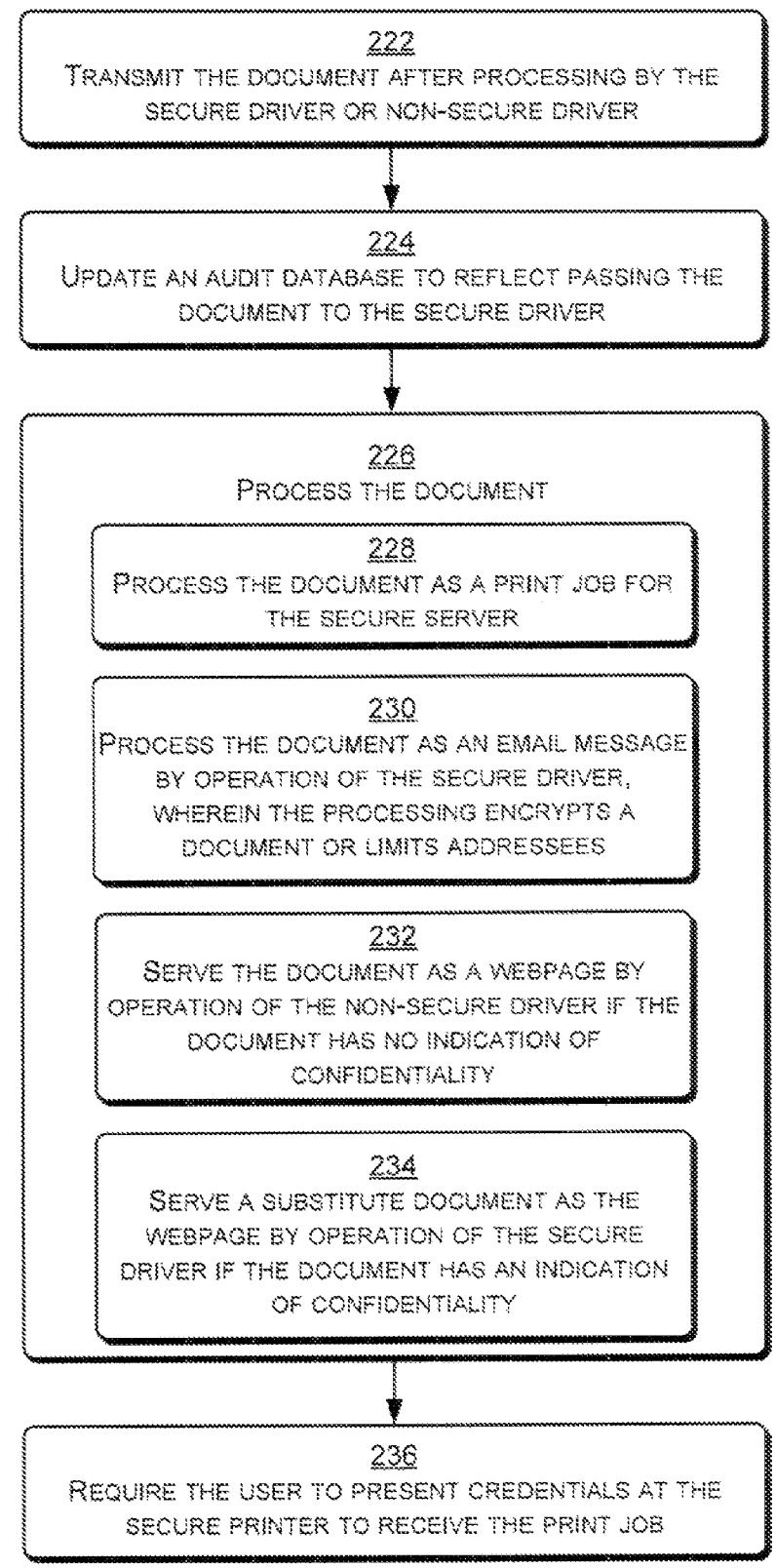

FIGS. 2A and 2B show an example method 200 illustrating aspects of secured document transmission discussed herein. The method 200 may be configured to be executed by a computing device. Accordingly, the method may be configured as computer readable instructions defined on one or more computer readable media 202 for operation on a computing device.

At block 204, a document is checked for an indication of confidentiality. The document may be any type of document or compute file, such as a word processing document, spreadsheet, database, presentation document (e.g. PowerPoint® from Microsoft Corporation), JPEG or other image document, etc. The document could additionally or alternatively be an email message, perhaps having other documents attached, thereby comprising a compound document. The document could additionally or alternatively be a webpage, served by a website host or server. Referring to the example of FIG. 1, the document 102 represents a generic document which may have an obvious confidentiality indicator 104 or a covert confidentiality indicator 106. Such a document 102 may be checked for an indication of confidentiality by a parsing unit 108 or analogous structure and/or device, as appropriate for a given application.

Blocks 206-210 show example aspects of the checking indicated by block 204. The example aspects may be used as alternatives, as options or in combination. In the example block 206, the document is parsed for a text string and/or other indication of confidentiality. Referring again to the example of FIG. 1, the document 102 can include an obvious text string of other indicator of confidentiality 104. Such a text string might say, "This document is confidential, and is property of XYZ Corporation" or "XYZ confidential." Such text strings are commonly located at the bottom of documents, or in a similar location of each page of the document.

In the example of block 208, the parsing process may be configured to recognize covert indications of confidentiality. A watermark is an example of a technology that can be used to indicate confidentiality in a covert manner, which is not easily recognizable by a human, but can be detected by machine.

In the example of block 210, common locations, such as headers and footers within the document, are parsed for confidentiality indicators. This example is suggestive of word processing documents. However, spreadsheets, presentation documents and other document types may similarly be parsed in key or prescribed locations for indications of document confidentiality.

At block 212, the document is passed to a secure driver in response to a finding of confidentiality. In the example of FIG.

1, the document 102 is passed to the secure driver 110 after the parser 108 detects the notice of confidentiality 104, 106 in the document 102. Blocks 214-218 show example aspects which may be addressed by operation of a secure driver. In the example block 214, the document may be diverted from a non-secure driver to the secure driver. This block envisions that the non-secure driver would otherwise receive the document but for the finding of confidentiality. Referring to the example of FIG. 1 for purposes of illustration only, the parsing unit 108 could divert the document 102 from the non-secure driver 110 to the secure driver 112 in response to the detection of an indication of confidentiality 104, 106. In the example of block 216, notice is sent to the user indicating that the document is confidential and that the document has been transmitted to a secure driver and/or printer. Such a notice could constitute a 'dialog box' in a graphical user interface or other interface and/or messaging system that is capable of alerting the user to the diversion of the document to secure processing means. However, it is common for users to click and close such dialog boxes without actually comprehending their message. Accordingly, the example of block 218 provides that optionally a notice to the user is printed at the non-secure printer, such as after a threshold period of time. For example, if the user fails to pick up the print job at a secure printer (which generally requires the user to provide identification to start the process) within a threshold period of time, then the system may assume that the user is waiting for the print job at the non-secure (i.e. the wrong) printer. Accordingly, the secure driver may cause the non-secure driver to send a print job to the user at the non-secure printer indicating that the print job has been redirected to the secure printer. Thus, the user waiting at the non-secure printer is redirected to the secure printer by a message printed at the non-secure printer telling the user to go to the correct (secure) printer, and to bring the required identification, credential, code, key or similar required information and/or device.

At block 220, the document is passed to a non-secure driver in response to failure to find an indication of confidentiality. Thus, blocks 212 and 220 may be viewed as alternatives, or may be viewed as a linear progression through a 'case' statement in computer programming code. Referring to FIG. 1 for an example, the parsing unit 108 can pass the document to the non-secure driver 112. Note that the non-secure driver 112 may be the typical or default driver, the use of which is overridden by the parsing unit 108 only where the document is found to be confidential. The reverse could also be implemented.

Moving to the second part of FIG. 2, FIG. 2B, and more particularly to block 222, the document is transmitted after processing by either the secure driver or the non-secure driver, as appropriate. Referring to the example of FIG. 1, the document may be transmitted to the secure printer 114, to the non-secure printer 120, to/through an email program 116 or to/through a website server/host 118 to a client (remote internet browser).

At block 224, an audit database is updated to reflect passage of the document to the secure driver (or to reflect the finding of confidentiality within the document). The audit database (seen in the example of FIG. 1 as database 128) therefore contains a record of which user printed, transmitted or otherwise acted upon/with any document and/or file having an indication of confidentiality. Thus, a substantial tool is provided to the information technology or systems administration managers to track and protect confidential files.

At block 226, the document is processed. Processing may be accomplished as required or preferred by circumstances, system design requirements and/or resource availability. Several examples illustrating document processing are shown by blocks 228-234. These examples are not meant to be exhaustive or limiting; instead, they are intended to illustrate examples of document processing. In the example shown by block 228, the document is processed as a print job for a secure printer. (The flowchart 200 does not show the known case, wherein the document is sent to the non-secure printer.) Processing the document as a print job for a secure printer may involve one or more processes. First, the print job may or may not be encrypted. The decision to encrypt may be influenced by the control the IT department has over the network between the users and the secure printer, as well as the control over the security of the secure printer (e.g. whether it is located in a secured room or location). If the control is not complete, encryption may be indicated. A second process that may be included at block 228 is selection of a secure printer. This will prevent the print job from being sent to a default or user-selected printer that is not considered secure. A third process that may be included at block 228 is that the identification of the user may be considered. Thus, some users may be allowed some latitude when handling confidential document, while other users may be prevented from printing and transmitting such documents.

In an alternative example shown at block 230, the document is processed as an email message by operation of the secure driver. In an email environment, the secure driver may use encryption to protect the email message and/or attachments. Alternatively, or additionally, the secure driver may limit the addressees of the email message. The addressees may be restricted to only those having a certain characteristic (e.g. certain domains(s)), or may be restricted from having a certain characteristic(s). In the example of block 232, the document is served as a webpage by operation of the non-secure driver if the document has no indication of confidentiality. In a contrasting example shown at block 234, a substitute document is served as the webpage by operation of the secure driver if the document has an indication of confidentiality.

At block 236, the user may be required to present credentials to receive the print job. In an example implementation wherein the document was processed by a secure printer, the user presents an employee badge, code or other credential, which causes the printer to instruct the secure printer driver to send the print job. The print job is then printed by the secure printer.

CONCLUSION

Although aspects of this disclosure include language specifically describing structural and/or methodological features of preferred embodiments, it is to be understood that the appended claims are not limited to the specific features or acts described. Rather, the specific features and acts are disclosed only as exemplary implementations, and are representative of more general concepts.

The invention claimed is:
1. A method for securing a document for transmission, comprising:
 checking the document for an indication of confidentiality;
 passing the document to a secure driver, in response to a finding of the indication of confidentiality;
 passing the document to a non-secure driver, in response to a failure to find the indication of confidentiality;
 transmitting the document after processing by the secure driver or the non-secure driver; and
 processing the document as an email message by operation of the secure driver, wherein the secure driver is config- ured as a plug-in for an email application program and wherein the processing encrypts the email message prior to transmitting.

2. The method of claim 1, wherein checking the document comprises
one of parsing the document for a text string indicating that the document is confidential or parsing the document for covert indications that the document is confidential.

3. The method of claim 1, wherein passing the document to the secure driver
further comprises processing the document as a print job of a secure printer, wherein the secure driver comprises a secure printer driver associated with the secure printer.

4. The method of claim 1, wherein the secure driver and the non-secure driver communicate with a secure printer and a non-secure printer, respectively, and wherein the secure printer and the non-secure printer are the same printer operating in a secure mode and a non-secure mode, respectively.

5. A system for transmission of documents, comprising:
a parsing unit configured to check a document for an indication of confidentiality;
a secure driver configured for processing the document if the indication of confidentiality is found; and
a non-secure driver configured for processing the document if no indication of confidentiality is found;
wherein the parsing unit is additionally configured to divert the document from the non-secure driver to the secure driver in response to finding the indication of confidentiality and to send notice to a user to report the diversion.

6. A method for securing a document for transmission, comprising:
checking the document for an indication of confidentiality;
passing the document to a secure driver, in response to a finding of the indication of confidentiality;
passing the document to a non-secure driver, in response to a failure to find the indication of confidentiality;
transmitting the document after processing by the secure driver or the non-secure driver; and
processing the document as an email message by operation of the secure driver, wherein the secure driver is configured as a plug-in for an email application program and wherein the processing allows the email message to go only to authorized addresses.

7. A method for securing a document for transmission, comprising:
checking the document for an indication of confidentiality;
passing the document to a secure driver, in response to a finding of the indication of confidentiality;
passing the document to a non-secure driver, in response to a failure to find the indication of confidentiality;
transmitting the document after processing by the secure driver or the non-secure driver;
serving the document as a webpage by operation of the non-secure driver if the document has no indication of confidentiality; and
serving a substitute document as the webpage by operation of the secure driver if the document has an indication of confidentiality;
wherein the non-secure driver and the secure driver are configured for operation within a website host.

8. A system for transmission of documents, comprising:
a parsing unit configured to check a document for an indication of confidentiality;
a secure driver configured for processing the document if the indication of confidentiality is found; and
a non-secure driver configured for processing the document if no indication of confidentiality is found;
wherein the parsing unit is additionally configured to divert the document from the non-secure driver to the secure driver in response to finding the indication of confidentiality and to send notice to a user to report the diversion;
wherein the parsing unit is additionally configured for parsing the document for covert indications that the document is confidential, and the system additionally comprises:
an audit database, updated to reflect the indications of confidentiality discovered by the parsing unit.

9. A system for transmission of documents, comprising:
a parsing unit configured to check a document for an indication of confidentiality;
a secure driver configured for processing the document if the indication of confidentiality is found; and
a non-secure driver configured for processing the document if no indication of confidentiality is found;
wherein the parsing unit is additionally configured to divert the document from the non-secure driver to the secure driver in response to finding the indication of confidentiality and to send notice to a user to report the diversion;
wherein:
the notice to the user comprises a dialog displayed on a user interface; and
the secure driver is a plug-in for an email application and is configured for both encrypting the document and filtering email addresses to which the email application is allowed to send the document.

10. A system for transmission of documents, comprising:
a parsing unit configured to check a document for an indication of confidentiality;
a secure driver configured for processing the document if the indication of confidentiality is found; and
a non-secure driver configured for processing the document if no indication of confidentiality is found;
wherein the parsing unit is additionally configured to divert the document from the non-secure driver to the secure driver in response to finding the indication of confidentiality and to send notice to a user to report the diversion;
wherein:
the notice to the user comprises a print job sent to a non-secure printer and indicates that the document was sent to a secure printer as a print job; and
the secure driver is a secure printer driver configured for use with a secure printer and for processing the document as a print job for the secure printer.

* * * * *